United States Patent
Scheel et al.

(10) Patent No.: US 12,246,818 B2
(45) Date of Patent: Mar. 11, 2025

(54) METHOD FOR PRODUCING AN ARMORED WALL IN AN AIRCRAFT AND AN AIRCRAFT SECTION COMPRISING AN ARMORED WALL

(71) Applicants: Airbus Operations GmbH, Hamburg (DE); Airbus Operations S.L., Getafe-Madrid (ES)

(72) Inventors: Henning Scheel, Hamburg (DE); César Rodriguez Barbero, Getafe-Madrid (ES); Esteban Martino-Gonzalez, Getafe-Madrid (ES)

(73) Assignees: Airbus Operations GmbH, Hamburg (DE); Airbus Operations S.L., Getafe (ES)

( * ) Notice: Subject to any disclaimer, the term of this patent is extended or adjusted under 35 U.S.C. 154(b) by 49 days.

(21) Appl. No.: 18/184,049

(22) Filed: Mar. 15, 2023

(65) Prior Publication Data
US 2023/0406477 A1    Dec. 21, 2023

(30) Foreign Application Priority Data
Mar. 31, 2022  (EP) .................................... 22166161

(51) Int. Cl.
*B64C 1/14*  (2006.01)
*B64D 45/00*  (2006.01)

(52) U.S. Cl.
CPC ........ *B64C 1/1469* (2013.01); *B64D 45/0061* (2019.08)

(58) Field of Classification Search
CPC ..... B64C 1/1469; B64D 45/0061; F41H 7/00; F41H 5/02
See application file for complete search history.

(56) References Cited

U.S. PATENT DOCUMENTS

2003/0058112 A1*  3/2003  Gleine ............... B64D 45/0036
                                                      109/3
2003/0080248 A1*  5/2003  Morgan ................ F41H 5/0457
                                                      244/118.5
(Continued)

FOREIGN PATENT DOCUMENTS

EP           3120103 B1      2/2020

OTHER PUBLICATIONS

European Search Report for European Patent Application No. 22166161.4 dated Sep. 29, 2022; priority document.

*Primary Examiner* — Rick K Chang
(74) *Attorney, Agent, or Firm* — Greer, Burns & Crain, Ltd.

(57) ABSTRACT

A method for producing an armored wall for an aircraft by determining an available thickness of the wall, an allowable areal mass of the wall, and an available space for a wall deformation due to ballistic impact. The method includes retrieving a parameterization of a plurality of armoring materials, which includes a parameter for each of a plurality of material characteristics for each of the plurality of armoring materials. The method also includes comparing the available wall thickness, the allowable areal mass, and the available deformation space with a corresponding parameter of the parameterization, selecting one armoring material for the wall from the plurality of armoring materials based on a result of comparing, and manufacturing a wall by supplementing the selected armoring material to a basic wall structure.

10 Claims, 3 Drawing Sheets

(56) References Cited

U.S. PATENT DOCUMENTS

| | | | |
|---|---|---|---|
| 2008/0164377 A1* | 7/2008 | Lautridou | B64C 1/1469 |
| | | | 244/118.5 |
| 2009/0273487 A1* | 11/2009 | Ferro | B64D 45/0026 |
| | | | 340/963 |
| 2013/0284003 A1 | 10/2013 | Dodworth | |
| 2014/0260933 A1 | 9/2014 | Ardiff et al. | |
| 2024/0124118 A1* | 4/2024 | Movsesian | B64C 1/1469 |

* cited by examiner

METHOD FOR PRODUCING AN ARMORED WALL IN AN AIRCRAFT AND AN AIRCRAFT SECTION COMPRISING AN ARMORED WALL

CROSS-REFERENCES TO RELATED APPLICATIONS

This application claims the benefit of European Patent Application Number EP 22166161.4 filed on Mar. 31, 2022, the entire disclosure of which is incorporated herein by way of reference.

FIELD OF THE INVENTION

The present disclosure generally relates to the security of a cockpit in an aircraft. Specifically, the present disclosure relates to armored walls in an aircraft, and particularly to a method for producing such wall.

BACKGROUND OF THE INVENTION

There is a particular need to protect a cockpit area of an aircraft from intruders and attacks on the pilot(s). For example, the cockpit door is provided with special locking mechanisms, and walls delimiting the cockpit from the passenger cabin are reinforced to be protected against ballistic impacts. Such reinforcement is also applied to walls adjacent to the cockpit door, such as separating walls and/or portions of a monument.

A known armoring material applied to walls is aramid as well as aluminum, ceramic, steel or titanium that all provide a high energy absorption. The drawback of these materials is a high areal mass (weight per area unit), which is usually contrary to the aims in aircraft technology, i.e., the achievement of lightweight components.

SUMMARY OF THE INVENTION

It is thus an object of the present disclosure to provide a method for producing an optimized armored wall in an aircraft and an aircraft section comprising such armored wall.

This object is solved by the present invention as defined in the independent claims. Preferred embodiments are defined by the dependent claims.

According to a first aspect to better understand the present disclosure, a method for producing an armored wall for an aircraft comprises determining an available thickness of the wall, determining an allowable areal mass of the wall, and determining an available space for a wall deformation due to ballistic impact.

The available thickness of the wall depends on the type of wall, such as a rather thin cockpit door or a rather thick galley wall, as well as statics, i.e., items mounted to the wall or loads to be transferred into the wall, and dynamic forces to be transferred into the wall. Further constraints to the available thickness of the wall are an available space in the aircraft or a reduced thickness, in order to gain space for aircraft components.

The allowable areal mass of the wall is to be understood as a desired weight of the entire wall divided by its area. The desired weight is usually to be kept to a minimum or may be limited by carrying capabilities of a floor or holding means for the wall.

The available space for a wall deformation is to be understood as a space in the direct vicinity to the wall that may be affected if the wall deforms due to ballistic impact. For example, it is often the case that electronic equipment and other sensible devices are installed on or at a wall of the cockpit. If a ballistic impact deforms the wall (usually towards the cockpit), such equipment and devices may be harmed by the deformation if not otherwise protected or if not enough space is available. The wall deformation is influenced by the elastic and/or plastic deformation of the armoring material.

Furthermore, a bullet may penetrate the armoring material when the elastic deformation is hindered under ballistic impact, such as by another rather rigid component in close vicinity to the wall. This effect is particularly observed for materials of high extensional wave speed, where the impact energy dissipation is driven by the panel deformation. The extensional wave speed describes the capability of a fiber or solid material to elongate in a certain time (e.g. under sudden impact). For example, a soft fiber may have higher extensional wave speed due to its "flexibility" compared with solid materials. Different fiber types may have different extensional wave speeds.

The method further comprises retrieving a parameterization of a plurality of armoring materials, wherein the parameterization comprises a parameter for each of a plurality of material characteristics for each of the plurality of armoring materials, comparing the available wall thickness, the allowable areal mass and the available deformation space with a corresponding parameter of the parameterization of the plurality of armoring materials, and selecting an armoring material for the wall based on a result of said comparing.

The parameterization can include one parameter value for each material characteristic and for each of the plurality of armoring materials. In other words, for each armoring material a respective parameter value specifying the material's characteristic with respect to wall thickness, areal mass as well as required deformation space is included in the parameterization. As a mere example, the parameterization may include for a specific aramid or UHMWPE a parameter value representing a high areal mass. Likewise, for a different material a parameter value representing a low wall thickness can be included in the parameterization.

Furthermore, the method further comprises manufacturing a wall by supplementing the selected armoring material to a basic wall structure. The basic wall structure can be any material, composite material, structure and the like that is usually employed to manufacture a wall for an aircraft cabin component or monument.

A wall of the aircraft can be a monument wall, the cockpit door, a separating wall or similar interior plane structure.

Thus, by contemplating the available wall thickness, the allowable aerial mass and the available deformation space of the wall, an optimized material can be determined and selected for a particular place of installation. For example, as an available deformation space in the area of the cockpit door is large, since usually no components are installed on the door, the parameter value for the available deformation space can be set to "high". This parameter value can interchangeably represent the deformation of the respective material, i.e., indicating that the respective material has a high deformation in case of a ballistic impact. This influences the selection of an armoring material that may be thick, in order to provide the required armoring capabilities. Likewise, if only a small deformation space is available, such as in case of components in the vicinity of the wall, a rather rigid material is required, which has a "low" parameter value for the available deformation space (i.e., the material has a low deformation in case of a ballistic impact).

Since the comparing takes into account at least three characteristics, an optimized material can be determined for the intended use.

In a variant, said comparing can comprise categorizing the available wall thickness, the allowable areal mass and the available deformation space, and deducting, from a respective value of the categorization, a value of the corresponding parameter for each armoring material. The categorizing can comprise converting an actual characteristic of the material into a particular categorization for comparability with the parameter values. For example, an areal mass of a material can be categorized in a certain number of classes from heavy to light, or a wall thickness can be categorized in a certain number of classes from thick to slim (or from high to low).

In this variant, said selecting can comprise determining the armoring material having the smallest deduction result. In other words, if the parameter value of a particular material comes close to the categorization of the corresponding characteristic (wall thickness, areal mass or deformation space) the deduction may result in a small value or zero.

In another variant, the method can further comprise determining at least one further characteristic of the wall to be manufactured, and said comparing further comprises comparing each of the at least one further characteristic with a corresponding parameter of the parameterization. Thus, the selected material can further be optimized depending on additional characteristics of the to be manufactured wall.

As a mere example, the at least one further characteristic can include fire properties, environmental robustness, static capacity, manufacturing complexity, configuration possibilities, and cost.

Fire properties can include fire resistance, a melting point, a behavior with increasing temperature, smoke development and the like.

Environmental robustness can comprise the stability of the material over time, particularly in view of dynamic loads induced into the wall during flight, or thermal loads induced into the wall due to different climates or conditioning of the cabin air, or influences of light, such as UV stability, or humidity, such as steam and water in a galley or lavatory.

The static capacity can include a capability of carrying a load (e.g., a payload mounted to the wall), or capability of withstanding static and/or dynamic loads, or particularly a resistance against bending or buckling, particularly in a vertical panel defined by the wall.

Manufacturing complexity can comprise a grade of difficulty to process the material and/or to combine the armoring material with another wall material or component. Likewise, the possibilities of repairing the manufactured wall comprising such armoring material at a later time influences the manufacturing complexity in the beginning.

Configuration possibilities can include the capability of mounting inserts or devices to a wall having the armoring material, such as whether specific armored inserts are required. Usually one or more insert are mounted to a wall of a monument in an aircraft, for example, to attach other components or features, which not only increases the overall load(s) introduced into the wall but may pierce through the armoring material. Such configuration possibility includes whether a plurality of features can be attached to the wall, such as a mirror, water pipes, faucet, sink, etc. As mere examples, further inserts can be employed to 1) connect inner walls, forming compartments (e.g. for an oven, container, etc.) or providing structural reinforcement, 2) provide connections and/or attachment points for ducting or other optional items of a monument configuration catalogue (e.g. cables, sensors, etc.), 3) attach further means, e.g., for edge or corner protections.

In a further variant, said manufacturing can comprise integrating the selected armoring material between two layers of a basic wall structure, adding the selected armoring material on at least one side of a layer of a basic wall structure, or mounting the selected armoring material on an existing wall.

Integrating the selected armoring material between two layers of a basic wall structure or wall material provides a good protection of the armoring material against environmental influences and/or fire. The basic wall structure/material can be a honeycomb composite panel and/or a glass or fiber panel. Both sides of the armoring material are protected by the basic wall structure/material against heat, fire, water, etc. Moreover, a standard insert can be mounted to the wall, particular into one of the layers of basic wall structure/material, which components usually offer a lower weight and reduced costs, compared to a penetration resistant design which is needed when the armoring panel is perforated or pierced by the insert. The two layer solution further allows a reduction of the impact energy by the first layer before the bullet hits the armoring material. Thus, the second layer thickness may be reduced.

The addition of the selected armoring material on at least one side of a layer of a basic wall structure or material can increase static capacity. Specifically, the basic wall structure/material can be a common structure/material that is designed for the usual statics of such wall. While introducing the armoring material between two layers may have a reduced shear strength of the entire wall, a "single layer" wall can have an increased static capacity over the two layer solution. For instance, while a statically "softer" armoring material can reduce the shear strength of a monument wall when integrated into a structural panel that is divided by the armoring material into two layers, an armoring material, which is added to a single structural panel, can reduce the overall wall thickness at same shear strength.

The manufacturing complexity is also reduced, since the armoring material may be applied onto an already produced single layer basic wall structure/material. On the other hand, the addition of the selected armoring material on one side of the wall (e.g., facing the impact origin) requires specific armored inserts, which may increase costs and weight.

Mounting the selected armoring material on an existing wall allows retrofit of an interior component of an aircraft with armoring capabilities. Such mounting can optionally include employing at least one fastener and/or an adhesive. In this case, it can be favorable to mount the armoring material on the side of the wall that faces the cockpit, in order to avoid dismounting or peeling-off the armoring material from the wall. On the other hand, a deformation "room" into the structural wall is not given, as the armoring material does not face the impact region. Thus, the deformation of the armoring material after a ballistic impact will increase significantly compared to the armoring material again provided on the side facing the impact direction.

In yet another variant, the plurality of armoring materials can comprise an ultra-high molecular weight polyethylene (UHMWPE). For instance, an UHMWPE can be UHMWPE HB311, HB26, XF-23, or XF-33. UHMWPE is a very lightweight material and provides high resistance against ballistic impact. Particularly, compared to aramid UHMWPE can have 30% less weight at the same ballistic performance. On the other hand, a dynamic deformation (particularly due to a ballistic impact) can be larger (up to 50%) compared to aramid. In addition, a melting point of UHMWPE is also lower compared with aramid fibers, so that a heat resistance layer may be employed with UHMWPE. The UHMWPE armoring material can be employed as a panel compacted and manufactured from fibers.

The armoring material can further include aramid, such as aramid CT736. However, the areal mass of aramid is much higher than of UHMWPE.

According to a second aspect to better understand the present disclosure, an aircraft section comprises at least one wall manufactured according to the method of the first aspect. The wall separates a cockpit area from a cabin area. Thus, depending on the aircraft (type, size, etc.), cabin type, interior installation next to the wall and/or cockpit type an optimized armoring material can be selected for the particular wall.

In a variant, the wall can be at least a portion of a monument or cockpit door. For instance, the monument can be a lavatory, a galley, a stowage (compartment), crew compartment, divider wall and/or separating wall. Moreover, the wall can also be or form part of a wall in a monument (other than a cockpit door).

The present disclosure is not restricted to the aspects and variants in the described form and order. Specifically, the description of aspects and variants is not to be understood as a specific limiting grouping of features. It is to be understood that the present disclosure also covers combinations of the aspects and variants not explicitly described. Thus, each variant or optional feature can be combined with any other aspect, variant, optional feature or even combinations thereof.

BRIEF DESCRIPTION OF THE DRAWINGS

In the following, the present disclosure will further be described with reference to exemplary implementations illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
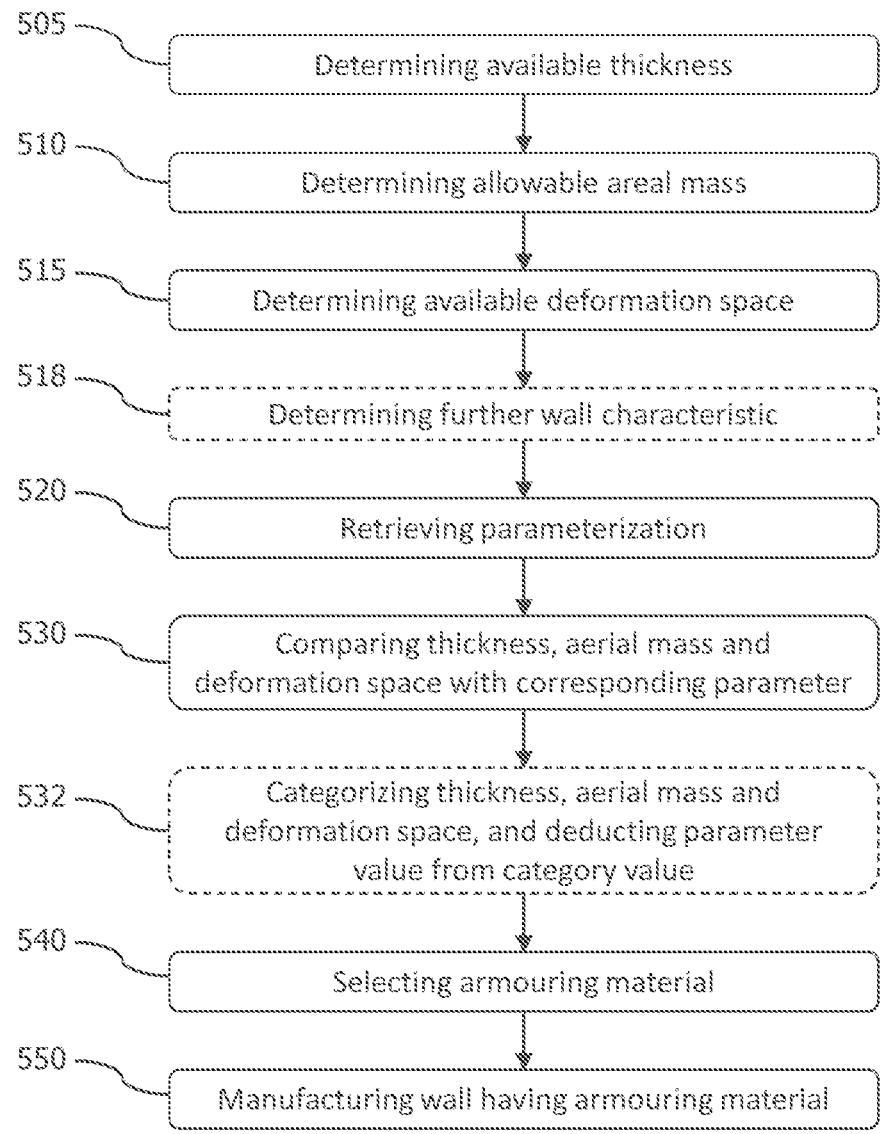
FIG. 1 schematically illustrates a method for producing an armored wall.
Figure 4:
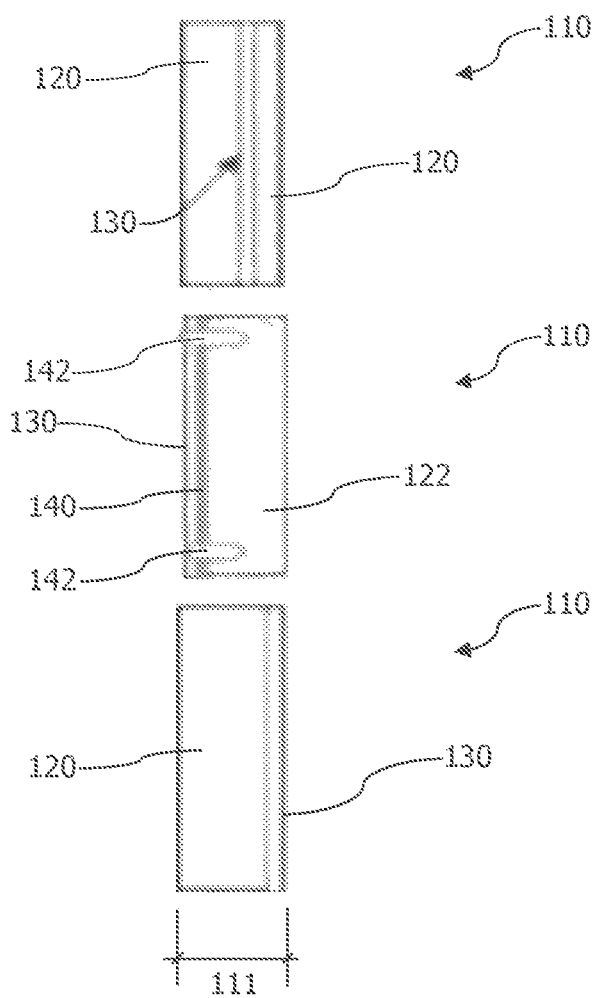
FIG. 4 schematically illustrates different types of armored walls.
Figure 5:
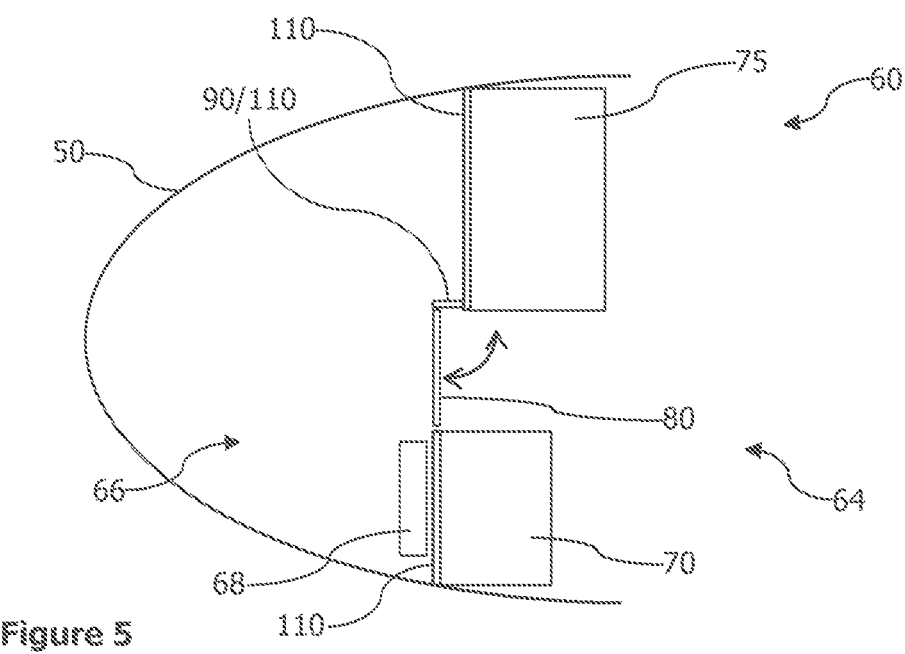
FIG. 5 schematically illustrates an aircraft section.

FIG. 1 schematically illustrates a method for producing an armored wall 110 (FIG. 4) for an aircraft 50 (FIG. 5). This method includes steps of designing the wall 110. The method begins in step 505 with determining an available thickness of the armored wall 110, such as the structural conditions in an aircraft section 60 (FIG. 5) including available space in the thickness direction and static requirements for the wall 110. In step 510 an allowable areal mass of the armored wall 110 is determined. It is to be understood that the areal mass is usually kept to a minimum, but further circumstances may require a certain weight, such as static requirements, installation capabilities etc. In another step 515, an available space for a wall deformation due to ballistic impact is determined. Such available space depends on whether one or both sides of the wall 110 (usually the side facing away from a possible ballistic impact) can move without interfering other components of the aircraft 50 if hit by a bullet. Usually, the ballistic impact leads to a deformation of the wall 110 while dissipating the impact energy. This deformation requires a certain space. If other components restrict or delimit such deformation and space for movement of the wall 110, this is determined in step 515. It is to be understood that the steps 505 to 515 may be performed in any desired order or simultaneously.

In an optional step 518, further wall characteristics of the wall 110 to be manufactured can be determined. Such further characteristics can include fire properties, environmental robustness, static capacity, manufacturing complexity, configuration possibilities, and costs. Any of these characteristics define the intended purpose of the wall 110 and the constraints to the wall 110 in the aircraft 50.

Furthermore, in step 520, a parameterization 200 (FIG. 3) is retrieved. The parameterization 200 includes parameters of a plurality of armoring materials 210. Specifically, the parameterization 200 comprises a parameter for each of a plurality of material characteristics for each of the plurality of armoring materials 210. Material characteristics correspond to the wall characteristics. For instance, armoring materials 210 can include an ultra-high molecular weight polyethylene (UHMWPE), aramid or a combination thereof. As a mere example, the armoring materials 210 can comprise UHMWPE HB311, HB26, XF-23, or XF-33, or aramid CT736.

The parameterization 200 comprises a parameter value for each of these materials and for each material/wall characteristic.

The method continues in step 530 with comparing at least the available wall thickness, the allowable areal mass and the available deformation space determined in steps 505 to 515 with a corresponding parameter of the parameterization 200 of the plurality of armoring materials 210.

Such comparing (step 530) can comprise an optional step 532 of categorizing the available wall thickness, the allowable areal mass and the available deformation space, and deducting, from a respective value of the categorization, a value of the corresponding parameter for each armoring material 210. In other words, the categorizing of the wall characteristic normalizes or standardizes the wall characteristic, in order to be comparable to the parameter values of the parameterization 200. Thus, the normalized or standardized values can be easily compared, such as by simply deducting the values from one another.

Furthermore, in step 540, an armoring material 130 for the wall 110 to be manufactured is selected based on the results of said comparing of step 530. For example, the armoring material 130 having the best matching parameters in the parameterization 200 is selected, since it best matches the intended purpose of the wall 110.

As a mere example, the selecting in step 540 can comprise determining the armoring material having the smallest deduction results from the deducting of the normalized or standardized values of the wall characteristics and the parameter values. In other words, the smallest deduction results (including zero) means that the particular armoring material 210 matches the particular characteristic of the wall

110. Furthermore, the deduction results of all characteristics and parameter values can be added together, so that the specific armoring material 130 from the plurality of armoring materials 210 having the best match (the smallest sum) can be selected in step 540.

Finally, in step 550, a wall having the selected armoring material 130 is manufactured. As a mere example, the manufacturing in step 550 can comprise integrating the selected armoring material 130 between two layers 120 of a basic wall structure 110 (FIG. 4). Alternatively, the selected armoring material 130 can be added on at least one side of a layer 102 of basic wall structure 110.

In case an existing wall 122 (FIG. 4) is already present, the selected armoring material 130 can be mounted to the existing wall 122. Such a retrofit can be achieved, for example, by employing at least one fastener 142 and/or an adhesive 140.

Figure 2:
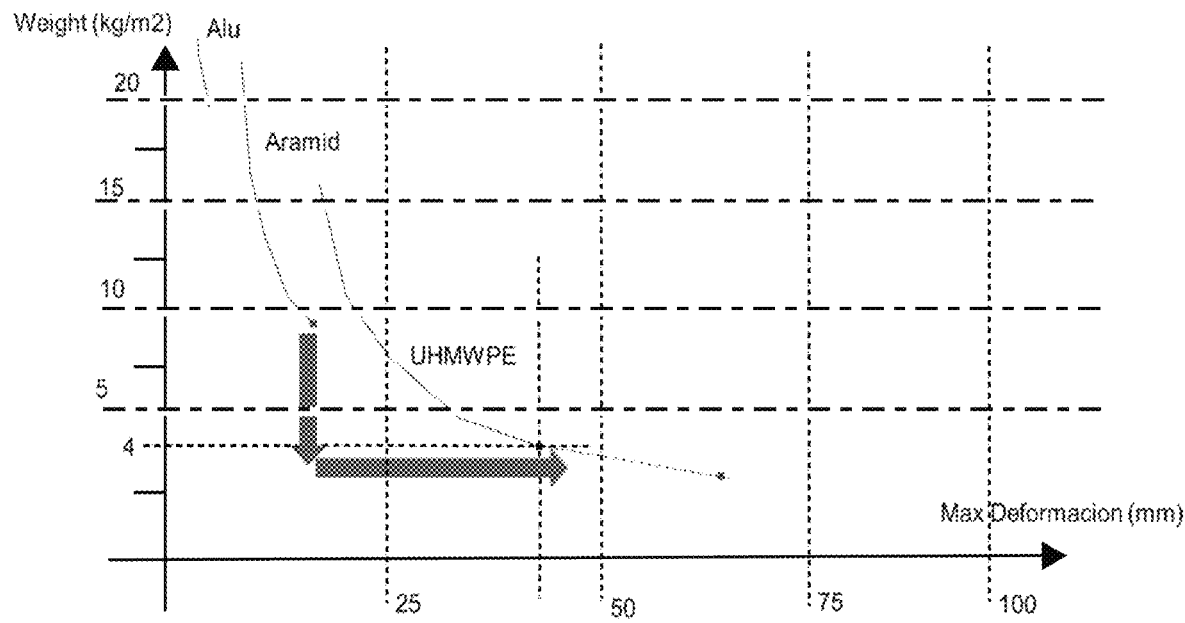
FIG. 2 schematically illustrates the relation between weight and maximum deformation for different bare armoring materials.

FIG. 2 schematically illustrates the relation between weight and maximum deformation due to ballistic impact for different armoring materials 210. While aluminum is very rigid and has a very small deformation, its areal mass (weight per area unit) is the highest of the three compared materials 210. Aramid or armoring materials 210 comprising an aramid fiber, for example, are still quite heavy. As can be derived from the diagram, the maximum deformation of aramid due to ballistic impact increases, the lighter the chosen material 130 is.

In order to save further weight, an ultra-high molecular weight polyethylene (UHMWPE) can be employed. For example, an armoring material 210 including UHMWPE fibers can be employed that is very lightweight, such as minus 30% to minus 50% of the weight of materials including aramid, as can be derived from the diagram of FIG. 2. However, with decreasing areal mass, the maximum deformation due to ballistic impact also increases. Thus, a compromise between both material characteristics and, hence, wall characteristics when including such material, has to be found.

Figure 3:
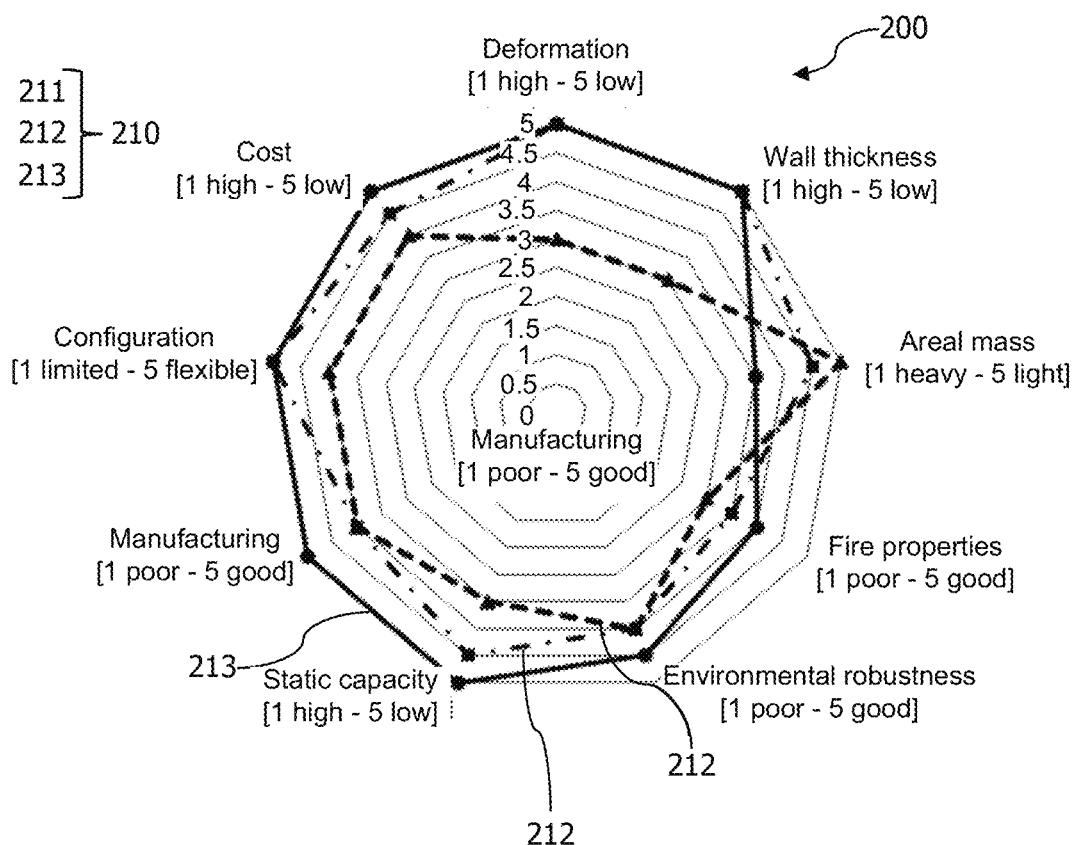
FIG. 3 schematically illustrates a parameterization of different armoring materials (when forming part of a wall) for a plurality of characteristics.

FIG. 3 schematically illustrates a parameterization 200 of different armoring materials 210 for a plurality of characteristics, which can be used in a method for producing an armored wall 110. As can be derived from FIG. 3, parameters for each of nine material characteristics for each of the plurality of armoring materials 210 have been developed and stored in a corresponding parameterization 200. Each material characteristic for the respective material 210 can be specified by a parameter value. These values have been standardized for the parameterization 200 and lie between 1 to 5, each representing how well the particular material achieves the respective material characteristic.

These material characteristics include deformation with a deformation parameter value between 1 for a high deformation due to ballistic impact (rather elastic material) and 5 for a low deformation due to ballistic impact (comparable to a high rigidity).

A further material characteristic is wall thickness, wherein 1 represents a high wall thickness and 5 represents a low wall thickness, that can be achieved. For instance, the possible wall thickness may further depend on a minimum impact resistance, such as an impact resistance given by a material specification and/or regulations and requirements for aircrafts.

Another material characteristic is areal mass, which is parameterized between 1 representing a high areal mass and 5 representing a low areal mass. This parameter value depends on, for example, the density of the material.

Further material characteristics are fire properties indicated between 1 representing poor fire properties and 5 representing good fire properties. It is to be understood that a good fire property is a higher resistance against fire.

Yet a further material characteristic is environmental robustness parameterized between 1 for a poor robustness and 5 for a good robustness. The environmental robustness covers aspects of water resistance, UV resistance, heat resistance and the like.

Another material characteristic is static capacity parameterized between 1 for a low capacity and 5 representing a high static capacity. This characteristic refers to the capability of the armoring material 210 to carry loads and/or supplements to the overall static capabilities of a wall 110 comprising, amongst others, the armoring material 210. For instance, if a sandwiched wall is formed including at least one layer of the armoring material 210, this material characteristic specifies whether the armoring material 210 increases or decreases the static capacity of the entire wall 110 compared to an unarmored wall.

Referring to another material characteristic, the manufacturing complexity can be taken into consideration. This parameter can vary between 1 for a poor manufacturing and 5 for a good manufacturing. In other words, if the handling of the material while manufacturing a wall 110 increases complexity and increases the likelihood of material defects, the parameter value is rather low. As a mere example, the manufacturing parameters for the integration of an armoring material into a structural wall also depends on considerations of the used armoring material. While aramid fibers are more resistant to higher temperatures and pressures (which may be applied when manufacturing the wall), UHMWPE materials require lower temperatures and pressures. This involves upfront consideration of the process used to manufacture the integrated structural-ballistic wall.

A further material characteristic is a configuration, such as configuration possibilities. Limited configuration possibilities are parameterized with a value of 1, while a flexible configuration achieved with the armoring material 210 is parameterized with a value of 5. The configuration may represent whether the armoring material 210 requires special further techniques and components to be employed in view of the wall 110. For instance, if the armoring material 210 requires that special inserts, faucets or other components are required, i.e. regular inserts, faucets or the like cannot be used, the configuration is limited and tends towards 1.

Finally, another material characteristic are the costs involved when employing the armoring material 210. Like with the other characteristics, high costs, i.e. a negative influence, is parameterized with the value of 1, while low costs, i.e. a positive or neutral influence of the armoring material 210 to the wall 110, is represented by a parameter value of 5. The costs may simply cover the costs of the armoring material 210 itself, but may further include cost factors due to increased manufacturing complexity or the like.

In the method of FIG. 1 such parameterization 200 can be employed for comparing determined wall configurations/characteristics for the to-be-manufactured wall with the different armoring materials 210. Thus, the parameterization 200 can be contemplated as a tool that only requires an input of desired wall properties/configurations/characteristics (including the circumstances where such wall 110 can be placed) and outputs the optimum material, i.e. the material where all material parameter values are the closest to the desired wall properties/configurations/characteristics.

It is to be understood that one or more of the parameters of the parameterization 200 may be weighted, so that the determination of the optimum armoring material 210 may be influenced based on user preferences.

FIG. 4 schematically illustrates different types of armored walls 110. Specifically, three different types are illustrated. From top to bottom, the walls 110 have an armoring material 130 integrated between two layers 120 of basic wall structure 110, have an armoring material 130 mounted to an existing wall 122, and have an armoring material 130 added on at least one side of a layer 120 of a basic wall structure 110.

The top wall type may have two layers 120 of basic wall structure 110, such as a honeycomb structure and/or a fiber glass panel. The integration of the armoring material 130 between both layers already provides a good protection of the armoring material 130. For example, in case of fire, heat, water or other environmental influences, that may negatively affect the armoring material 130, the two layers 120 provide a good protection.

Furthermore, since layers 120 of the basic wall structure 110 are applied on both sides, regular inserts, faucets, mirrors, and other components can be installed on such wall, since they may not require piercing through the armoring material 130. Another advantage of this structure is that both layers reduce the energy induced by a ballistic impact, i.e. before a bullet hits the armoring material 130. The layer 120 on the side facing away from a possible impact further improves the deformation capability of the wall 110, since it provides rigidity to a (rather) elastic armoring material 130.

The middle type in FIG. 4 illustrates an existing wall 122 that requires retrofit, i.e. the supplementation of an armoring material 130. Such armoring material 130 may simply be adhered by an adhesive 140 to the wall 122. Alternatively or additionally, fasteners 142 may be employed to mount the armoring material 130 to the wall 122. Such fasteners 142 may be screws specifically designed for ballistic impact as well as non-ballistic impact. Furthermore, the armoring material 130 may be supplemented to the wall 122 in a fabric packaging (comparable to a ballistic vest).

The bottom type in FIG. 4 illustrates a wall structure having only one layer 120 of basic wall structure 110 and one layer of armoring material 130. On the one hand, the thicker layer 120 of wall structure 110 allows good deformation capabilities of the entire wall 110 and further allows a wall thickness 111 close to regular walls without armoring material 130. On the other hand, if an insert or other component is to be mounted on the side of the wall 110 comprising the armoring material 130, a special insert, fastener or component is required that has armoring characteristics. Such components may be more expensive.

The manufacturing of a new wall 110 (top and bottom wall type in FIG. 4) can include a pre-processing of the basic wall structure 110 and adhering the armoring material 130. The manufacturing process of armoring material 130 may require a press cycle to consolidate the fibers with high pressure and temperature (for example, at a pressure between 55 to 165 bar and a temperature of 130° C. (+/−10° C.)). Precautions have to be taken to control the variations of pressure and temperature during the press cycle to avoid degradation of the ballistic performance.

FIG. 5 schematically illustrates an aircraft section 60, here the nose of an aircraft 50. This aircraft section 60 comprises a cockpit area 66 and a cabin area 64. In order to protect the cockpit 66 and the pilots, an armored wall 110 is formed as a barrier between both areas 64, 66.

The armored wall 110 can be implemented at least partly in a cockpit door 80. In other words, the cockpit door 80 can have any of the structures illustrated in FIG. 4. The armored wall 110 can also be a separating wall 90, i.e. a freestanding, non-movable wall.

As the area of the cabin area 64 close to the cockpit 66 usually houses certain interior aircraft components—also referred to as a monument, such as a lavatory 70 or a galley 75, the armored wall 110 can form a portion of such monument. For instance, a wall facing the cockpit area 66 can be manufactured according to the method illustrated in FIG. 1, i.e. can be an armored wall 110, while all the remaining monument walls are regular walls, for example, comprising only one or more layers 120 of the basic wall structure 110.

In the cockpit 66 there can be arranged a special component, such as an electronic component 68, which shall not be exposed to impacts or the like. Usually such electronic components 68 are arranged behind the pilots, i.e. adjacent to a wall separating the cabin area 64 from the cockpit area 66. Thus, the armored wall 110 shall not have a high deformation due to ballistic impact, i.e. shall not have a high deformation in a direction into the cockpit 66, if the armored wall 110 is adjacent to such component 68.

The present invention may utilize a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing an armored wall for an aircraft, the method comprising:
  determining an available thickness of the armored wall;
  determining an allowable areal mass of the armored wall;
  determining an available space for a wall deformation due to ballistic impact;
  retrieving a parameterization of a plurality of armoring materials, wherein the parameterization comprises a parameter for each of a plurality of material characteristics for each of the plurality of armoring materials;
  comparing the available wall thickness, the allowable areal mass, and the available space for a wall deformation with the parameter of the parameterization of the plurality of armoring materials;
  selecting one of the armoring materials based on the comparing; and
  manufacturing the armored wall by supplementing the one of the armoring materials to a basic wall structure.

2. The method of claim 1, wherein said comparing comprises categorizing the available wall thickness, the allowable areal mass, and the available space for a wall deformation, and deducting, from a respective value of the categorizing, a value of the parameter for each armoring material, and
  wherein said selecting comprises determining the armoring material having the smallest deduction result.

3. The method of claim 1, further comprising:
  determining at least one further characteristic of the armored wall to be manufactured,
  wherein said comparing further comprises comparing each of the at least one further characteristic with the parameter of the parameterization.

4. The method of claim 3, wherein the at least one further characteristic includes fire properties, environmental robustness, static capacity, manufacturing complexity, configuration possibilities, and cost.

5. The method of claim 1, wherein said manufacturing comprises integrating the one of the armoring materials between two layers the armored wall, adding the one of the armoring materials on at least one side of a layer of the armored wall, or mounting the one of the armoring materials on the armored wall.

6. The method of claim 5, wherein mounting includes employing at least one fastener, or an adhesive, or both.

7. The method of claim 1, wherein the plurality of armoring materials comprises an ultra-high molecular weight polyethylene.

8. An aircraft section, comprising:
  at least one armored wall manufactured according to the method of claim 1,
  wherein the at least one armored wall separates a cockpit area from a cabin area.

9. The aircraft section of claim 8, wherein the at least one armored wall forms at least a portion of a monument or a cockpit door.

10. The aircraft section of claim 9, wherein the monument is a lavatory, or a galley, or a separating wall.

* * * * *